Nov. 17, 1953
R. E. CHERRY
2,659,220
DRIVE TORQUE LIMITING DEVICE
Filed Nov. 12, 1949
2 Sheets-Sheet 2
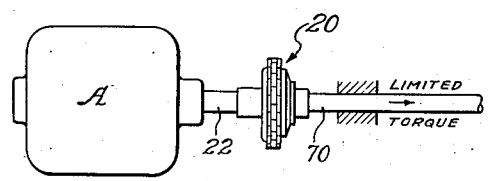
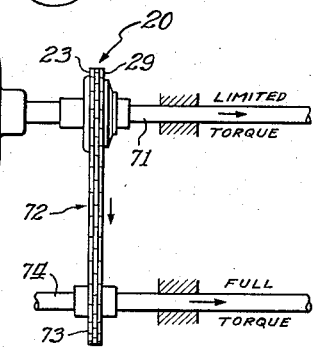
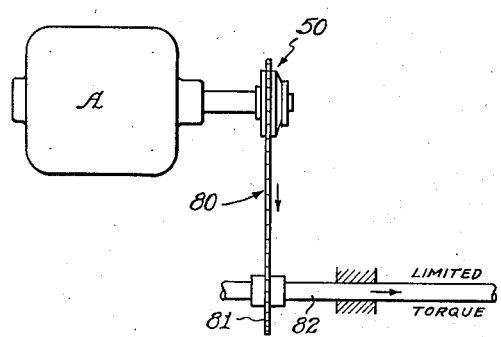
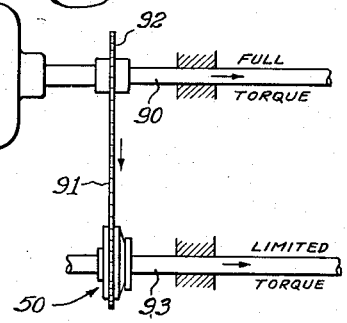
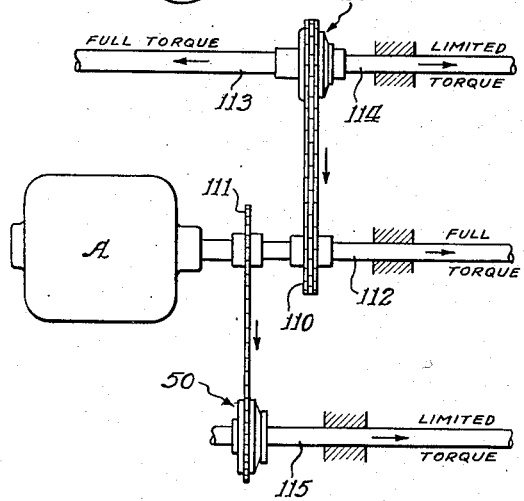
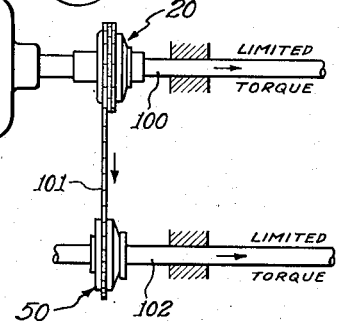
Inventor:
Ralph E. Cherry Patented Nov. 17, 1953

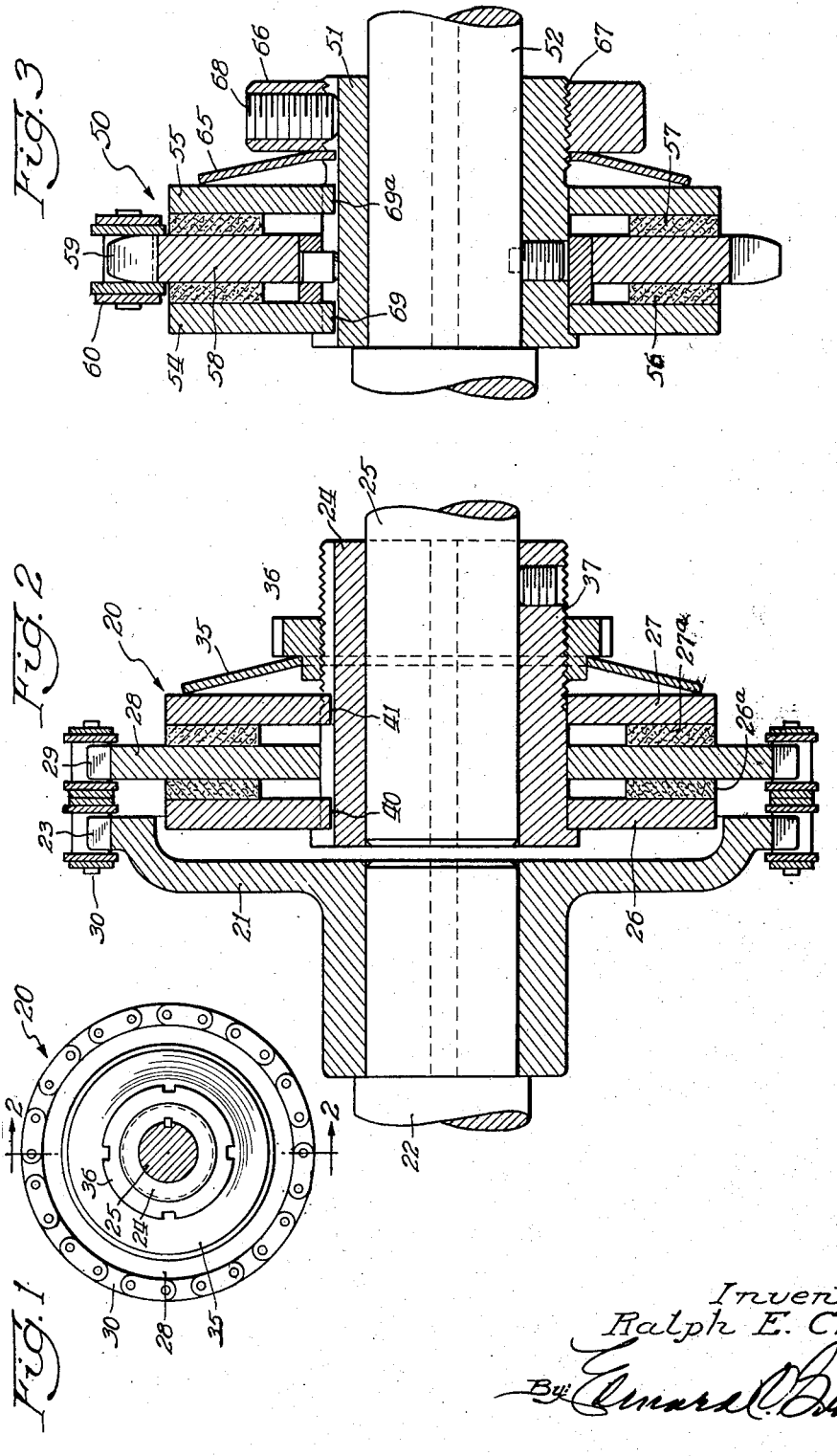

2,659,220

UNITED STATES PATENT OFFICE 2,659,220

DRIVE TORQUE LIMITING DEVICE

Ralph E. Cherry, Detroit, Mich., assignor to Morse Chain Company, Ithaca, N. Y.

Application November 12, 1949, Serial No. 126,880

5 Claims. (Cl. 64—19)

This invention relates in general to drive torque limiting clutches and is particularly concerned with a combination of flexible coupling or sprocket with a torque limiting clutch adapted for advantageous employment as a means for transmitting power between two movable objects of a power transmission system, said arrangement being particularly characterized by the provision of automatic means to prevent transmission of power above a certain predetermined torque load.

Heretofore, many forms of torque overload safety devices have been employed in order to prevent destruction of adjacent machinery in the event of overload with respect to power requirements. These various forms have included elaborate and expensive means connected with the primary power source such as, for example, motor resistance devices, safety overload devices, etc. However, in some applications it has been found that two different power requirements were necessary. For example, several mechanisms may be driven from one single power source, each of said mechanisms having different requirements of power. In such a case it may be advantageous to supply the full load of power to one mechanism while being able to limit the power requirement to other mechanisms requiring less power for their operation.

It is recognized that in the prior art numerous attempts have been made to provide a drive torque limiting device of this general class and efforts have been made to overcome the various deficiencies found in such prior art structures, but to the best of the applicant's knowledge the prior art structures have had only limited success, and have been accorded only limited commercial recognition. It is believed that this fact results from apparent deficiencies of the prior art structures, their non-adaptability for universal application and their expensive construction which so greatly increased the cost as to seriously handicap sales acceptance.

The present improvements in drive torque limiting devices are directed to simplify their construction and their mode of operation, and also to provide a drive torque limiting device which may readily and conveniently be employed universally to various power transmission arrangements, and particularly so where it is desired to transmit from a single power source full power to one or more mechanisms while transmitting limited power to one or more other mechanisms. Moreover, the present device seeks to employ conventional parts wherever necessary and possible, thereby to effect a substantial reduction in the cost over prevailing types of drive torque limiting devices presently being employed.

Accordingly, an object and accomplishment of the invention is to provide a drive torque limiting device adaptable for advantageous employment in power transmission equipment where it is desired to limit the amount of power being transmitted, said device being provided with adjustable means to vary the limits of transmission of power.

Another object and accomplishment of the invention is to provide a drive torque limiting device comprising a flexible coupling arranged to transmit power between a driving and a driven shaft, said flexible coupling having combined therewith a so-called Belleville washer type spring arranged to provide pressure between friction facings forming a part of the flexible coupling, said coupling having operatively associated therewith and related to the Belleville washer adjustable means to vary the range and limits of power transmission through the flexible coupling.

A further object and accomplishment of the invention is to provide a sprocket with a so-called Belleville type washer, said sprocket having operatively associated therewith and arranged to operate in cooperation with the Belleville washer an adjustable means to effect varying degrees of tension so as to vary the pressures imparted by the Belleville washer upon friction facings associated with the sprocket, thereby to provide a means for limiting the power passing through the sprocket.

A still further object and accomplishment of the invention is to provide an improved drive torque limiting device by co-relating and especially designing the various elements thereof, whereby there shall be such cooperation between said improved elements as will best serve the purpose of providing an efficient drive torque limiting device capable of being manufactured at low cost and yet giving maximum of satisfactory service in use.

The invention seeks, as a further object and accomplishment, to provide a drive torque limiting device as contemplated herein and characterized by an arrangement of parts to more advantageously and satisfactorily perform the functions required of it and adapted to provide a compact unit which will successfully combine the factors of structural simplicity and durability and yet be economical to manufacture.

Additional objects, features and advantages of the invention disclosed herein will be apparent to persons skilled in the art after the construction and operation are understood from the within description.

It is preferred to accomplish the various objects of the invention and to practice the same in substantially the manner as hereinafter more fully described, and as more particularly pointed out in the appended claims.

With the above and other incidental objects in view, the invention has other marked improvements and superiorities which radically distinguishes it from presently known structures, these improvements in the invention residing in the novel construction and cooperative function of the parts thereof, the combination of the parts and the arrangement thereof as illustrated in the drawings and which will be more fully described hereinafter and particularly pointed out in the claims.

In the accompanying drawings on which there is shown a preferred embodiment of the invention, Figure 1 is a side elevational view of a flexible coupling having incorporated therein the drive torque limiting device embodying the features of the present invention;

Fig. 2 is a sectional view of the flexible coupling depicted in Fig. 1 and being taken substantially on the plane of the line 2—2 in Fig. 1;

Fig. 3 is a sectional view of a sprocket drive arrangement showing a slightly modified form which may be employed for a different application but incorporating the drive torque limiting device embodying the features of the present invention;

Fig. 4 is a diagrammatic illustration of one form of application of the drive torque limiting device depicted in Fig. 2;

Fig. 5 is another form of application of the drive torque limiting device depicted in Fig. 2;

Fig. 6 is a diagrammatical illustration of one form of application of the drive torque limiting device depicted in Fig. 3;

Fig. 7 is a diagrammatical illustration of another form of application of the drive torque limiting device depicted in Fig. 3;

Fig. 8 is a diagrammatical illustration of one form of application wherein both forms of drive torque limiting devices as illustrated in Figs. 2 and 3 may be advantageously employed; and Fig. 9 is a diagrammatical illustration of another form of application wherein both forms of drive torque limiting devices as illustrated in Figs. 2 and 3 may be advantageously employed.

The drawings are to be understood as being more or less of a schematic character for the purpose of illustrating and disclosing a typical or preferred form of the improvements contemplated herein, and in the drawings like reference characters identify the same parts in the several views.

As possible examples of advantageous employment of the contemplated drive torque limiting device, reference is made to the drawings, particularly Figs. 4, 5, 6, 7, 8 and 9 wherein there are illustrated the drive torque limiting devices with which the present invention is particularly concerned, the one form as exemplified in Fig. 2 being designated in its entirety by the numeral 20 and the other form as exemplified in Fig. 3 being designated in its entirety by the numeral 50, each of the forms being operatively associated, for example, with a conventional drive mechanism or other suitable source of power designated in its entirety by the letter A.

The illustrated driving mechanism A may comprise an electric motor, a gasoline engine, or any other suitable means which may be employed as a source of power, the illustrated drive mechanism A being only diagrammatically shown as one possible source of power.

Suffice it to say, since the invention is not particularly concerned with the precise construction of the illustrated driving mechanism A and/or its associated parts they will not be further described in detail, and it is deemed sufficient for all intentions and purposes herein contained to show only portions adjacent to and cooperating with the drive torque limiting device contemplated herein. It is to be understood that details of construction of such driving mechanism with which the drive torque limiting device contemplated herein may be advantageously employed, and/or its associated parts, may be modified to suit particular conditions or to satisfy the engineering genius of various manufacturers, and in some instances the contemplated drive torque limiting device may be advantageously employed with other types of driving mechanisms, and I do not wish to be limited to the construction of these elements as set forth except where such construction particularly concerns the invention contemplated herein.

Having thus described, by way of example, several possible adaptations of the drive torque limiting devices generally indicated at 20 and 50 and as contemplated herein, and having described the general environment surrounding the adaptation, the specific construction and cooperative functions of the parts of said drive torque limiting devices with which the present invention is particularly concerned, will now be described in detail.

In the exemplary embodiment of the invention depicted in Figs. 1 and 2, the drive torque limiting device 20 contemplated by the present invention comprises, in general, a driving hub member 21 suitably keyed to a driving shaft 22 for rotation therewith, said driving hub being provided with sprocket teeth formations 23, a driven hub 24 suitably keyed to a driven shaft 25, said driven hub being provided with a pair of pressure plates 26 and 27 respectively having friction surfaces 26a and 27a which have operatively disposed therebetween a driven sprocket member 28 which is free to rotate upon portions of the driven hub 24 under certain conditions, said driven sprocket member 28 being provided with sprocket teeth formations 29 in alignment with and located in close proximity to the sprocket formations 23 which form a part of the driving hub 21, said driving hub member 21 and said driven sprocket member 28 being arranged to rotate together by means of an encircling chain 30 having links arranged to receive the sprocket formations 23 and 29 so as to not only cause simultaneous rotation of the sprocket formations but also to provide a flexible coupling arrangement, and a Belleville spring type washer 35 arranged to cooperate with the pressure plate 27 having the friction surfaces 27a to provide a selected pressure to the pressure plates, said selected pressure being manually adjustable by means of the collar 36 carried by the driven hub 24 and arranged on threaded formations 37 whereby the collar may be rotated and moved axially of the driven hub 24 in order to provide varying pressure upon the Belleville spring type washer.

In Fig. 2 it can be seen that the pressure plates 26 and 27 are keyed to the driven hub member 24 as at 40 and 41 respectively, but the pressure plates are permitted limited movement axially of the driven hub member 24 thereby to accommodate for the most advantageous operative position of the driven sprocket member 28. It is notable that the driven sprocket member 28 is free to rotate upon the driven hub member 24 only when the driving torque is of such magnitude so as to overcome the pressure applied to the pressure plates by the Belleville spring type washer 35. In normal operation, within the driving torque limitations, the pressure plates will grip the sprocket driven member 28 thereby to provide driving torque within a contemplated range.

Although the driving member has been indicated as the shaft 22 and the driven member has been indicated as the shaft 25, it is obvious that in some applications it may be desirable to have the shaft 25 as the driving member and the shaft 22 as the driven member. For example, in the event that the shaft 22 is connected with adjacent machinery (not shown) which may be subjected to shock loads or peak loads which may cause overload to the power source, in such cases, it would be advantageous to drive through the driving torque limiting device contemplated by this invention so as to prevent overloading of the power source. Conversely, where the power source is more than adequate the mechanism may be employed as hereinbefore described so as to prevent overload to the driven mechanisms, which arrangements will be hereinafter described more in detail with respect to the various possible arrangements of the drive torque limiting devices illustrated in Figs. 4, 5, 6, 7, 8 and 9.

In the exemplary embodiment of the invention depicted in Fig. 3, the drive torque limiting device 50 contemplated by the present invention comprises, in general, a driving hub 51 suitably keyed to a driving shaft 52 for rotation therewith, said driving hub being provided with a pair of pressure plates 54 and 55 respectively having friction surfaces 56 and 57 which have operatively disposed therebetween a driven sprocket member 58 which is free to rotate upon portions of the driving hub 51 under certain circumstances, said driven sprocket member 58 being provided with sprocket teeth formations 59 arranged to carry a suitable chain drive 60, and a Belleville spring type washer 65 arranged to cooperate with the pressure plate 55 having the friction surfaces 57 to provide a selected pressure to the pressure plates, said selected pressure being manually adjustable by means of the collar 66 carried by the driving hub 51 and arranged on threaded formations 67 whereby the collar may be rotated upon loosening of the set screw 68 and thereafter moved axially of the driving hub 51 in order to provide varying pressure upon the Belleville spring type washer 65.

It is obvious that the drive through the drive torque limiting device 50 may be accomplished in one of two ways, that is to say, the driving force may be transmitted through the shaft 52 and be passed through the drive torque limiting device 50 and transmitted to the sprocket member 58 and thereafter to the chain 60, or, the drive may start in reverse direction from the chain to the driven sprocket member 58 to the pressure plates and thereafter to the hub 51 and the shaft 52. In either case, it is obvious that torque will only be transmitted through the drive torque limiting device 50 so long as the torque is within the range permitted by the pressure of the Belleville spring type washer which, as hereinbefore described, is adjustable by means of the axial movement of the collar 66. It is further obvious that since the torque limiting device 50, shown in Fig. 3, has a single sprocket member 58, a chain of the type which can be suitably arranged to receive the sprocket teeth formations thereof is all that is necessary.

The pressure plates 54 and 55 are respectively keyed to the driving hub 51 as at 69 and 69a but are permitted limited movement axially of the driving hub member 51 in order to accommodate the respective position of the driving sprocket member 58 and to accommodate for wear of the friction surfaces 56 and 57.

After having specifically described the general construction of drive torque limiting device 20 and 50, particular attention is directed to Figs. 4, 5, 6, 7 and 8 which are disclosed for the purpose of illustrating some of the many possible driving arrangements with which the driving torque limiting devices may be advantageously adjunctively employed.

For example, in Fig. 4, the drive torque limiting device 20 is shown mounted in conjunction with the power source A. In this arrangement the drive torque limiting device 20 will act as a flexible coupling and also provide an arrangement whereby only limited torque will be applied to the shaft 70.

In Fig. 5, the drive torque limiting device 20 is shown as providing a two-way drive arrangement whereby limited torque will be applied to the shaft 71 while the sprocket formations 23 and 29 will carry a suitable chain drive 72 arranged to drive the sprocket 73 which is carried by a shaft 74. It is obvious that the full load of the power source will be applied to the chain drive 72 and to the shaft 74 while limited torque will be transmitted to the shaft 71 because of the drive torque limiting device 20 contemplated by this invention.

In Fig. 6 there is illustrated a possible application of the drive torque limiting device 50 as illustrated in Fig. 3. It is obvious that the power transmitted through the drive torque limiting device 50 and being transmitted through the chain 80 to the sprocket 81 and thereafter to the shaft 82 will be limited according to the amount of pressure which the Belleville spring type washer 65 will apply to the pressure plate 55.

In Fig. 7 the drive torque limiting device 50 is applied to a power source which permits full torque to be transmitted through the shaft 90 and by virtue of the chain drive 91 connected with the sprocket 92 mounted on the shaft 90, limited torque will be transmitted to the shaft 93 because the drive is accomplished through the driving torque limiting means 50.

In Fig. 8, the drive torque limiting devices 20 and 50 are applied to the power source so that limited torque will be applied to the shaft 100 by virtue of the driving torque limiting means 20 and by virtue of the chain drive 101 which is connected to the drive torque limiting device 50, limited torque is applied to the shaft 102 which carries the drive torque limiting device 50. It is obvious that limited torque will be transmitted to both of the shafts 100 and 102 because the drive is accomplished respectively through the drive torque limiting devices 20 and 50.

In Fig. 9, the drive torque limiting devices 20 and 50 are applied to the power source through the medium of sprockets 110 and 111 which will give shaft 112 full torque capacity and by virtue of the drive torque limiting device 20 the shaft 113 will receive full torque capacity while the shaft 114 will receive limited torque capacity and the shaft 115 will receive limited torque capacity by virtue of receiving its power through the drive torque limiting device 50.

It is obvious that various other arrangements can be made depending on the situations and the prevailing conditions. Moreover, it is important to understand that in each of the applications shown, the power source may be advantageously applied in the opposite direction, thereby to accommodate several other adaptations as desired. It is obvious and this invention comprehends that the sprocket 59 could also be a V belt pulley, a gear, or similarly functioning part and that the torque limiting device may also be employed as a slip clutch for starting heavy loads.

From the foregoing disclosure, it may be seen that I have provided an improved drive torque limiting device particularly adaptable in power transmission applications and which efficiently fulfills the object thereof as hereinbefore set forth and which provides numerous advantages which may be summarized as follows:

1. Structurally simple, efficient and durable;
2. Economical to manufacture and readily adaptable to mass production manufacturing principles; and
3. The provision of a drive torque limiting device which may readily and conveniently be employed universally to various power transmission arrangements, and particularly so where it is desired to transmit from a single power source full power to one or more mechanisms while transmitting limited power to one or more other mechanisms.

While I have illustrated preferred embodiments of my invention, many modifications may be made without departing from the spirit of my invention, and I do not wish to be limited to the precise details of construction set forth, but wish to avail myself of all changes within the scope of the appended claims.

I claim:

1. A drive torque limiting clutch comprising a driving hub member keyed to a driving shaft for rotation therewith and having sprocket teeth formations, driven hub keyed to a driven shaft, said driven hub having a pair of pressure plates respectively having friction surfaces which have operatively disposed therebetween a sprocket member which is free to rotate upon portions of the driven hub under certain conditions, said driven sprocket member being provided with sprocket teeth formations in alignment with and located in close proximity to the sprocket formations which form a part of the driving hub, said driving hum member and said driven sprocket member being arranged to rotate together by means of an encircling chain having links arranged to receive the sprocket formations so as to cause simultaneous rotation of each of the sprocket formations and also to provide a flexible coupling arrangement, a Belleville spring type washer in contact with at least one of said pressure plates to provide a selected pressure to the pressure plates, and a collar carried by the driven hub and arranged on threaded formations whereby the collar may be rotated and moved axially of the driven hub in order to provide varying pressure upon the Belleville spring type washer.

2. A drive torque limiting clutch comprising a first hub mounted on a first shaft for rotation therewith and having sprocket teeth formations, a second hub mounted on a second shaft and having a pair of pressure plates respectively having friction surfaces which have operatively disposed therebetween a sprocket member which is free to rotate upon portions of the second hub under certain conditions, said sprocket member being provided with sprocket teeth formations in alignment with and located in close proximity to the sprocket formations which form a part of the first hub, said first hub and said sprocket member being arranged to rotate together by means of an encircling chain having links arranged to receive the sprocket formations so as to cause simultaneous rotation of each of the sprocket formations and also to provide a flexible coupling arrangement, and a Belleville spring type washer in contact with at least one of said pressure plates and including adjustment means manually operable to vary the tension of said spring to provide a selected pressure to the pressure plates.

3. In a drive torque limiting clutch of the character described, sprocket members arranged to rotate together by means of an encircling chain having links arranged to receive the sprocket formations on each of said sprocket members so as to cause simultaneous rotation of each of the sprocket members and also to provide a flexible coupling arrangement therebetween, pressure plate means arranged in frictional engagement with one of said sprocket members, a Belleville spring type washer in contact with said pressure plate means to provide a selected pressure to the pressure plate means, and means manually movable and in contact with said Belleville washer to vary the pressure imparted by said Belleville washer.

4. In a power transmission drive arrangement, coaxially arranged shafts, a constant power source arranged to transmit power to one of said shafts; and a torque responsive clutch operatively disposed between said shafts and comprising relatively rotatable clutch members, one of said clutch members including a sprocket member, another of said clutch members including a second sprocket member, a chain disposed to receive sprocket tooth formations of each of said sprocket members so that said sprocket members will rotate constantly in unison, pressure plate means normally in frictional engagement with one of said clutch members to cause rotation of said clutch members in unison within a range of predetermined drive torque and permitting relative rotation of said clutch members upon application of torque greater than said predetermined range, means comprising a Belleville spring type washer in contact with said pressure plate means to provide a selected pressure to said pressure plate means, and means manually movable and in contact with said Belleville washer to vary the pressure imparted by said Belleville washer thereby to vary the range of effective drive torque, whereby limited power is transmitted to the other of said shafts within the range of drive torque.

5. A drive torque limiting device comprising a driving member having sprocket teeth formations, a driven member having frictional plates disposed for rotation therewith, said driven member also having a sprocket member operatively disposed between the friction plates and free to rotate on portions of the driven member, said sprocket member having sprocket teeth formations thereon which are located in close proximity to the sprocket teeth formations of said driving member, an encircling chain having links arranged to receive the sprocket formations of said driving and driven members so as to cause simultaneous rotation of said driving member and said driven member, means in contact with at least one of said friction plates and including manually operable spring means to provide a selected pressure to the friction plates whereby said portion of the driven member is caused to rotate with said sprocket members and to vary the torque range permitted by said friction plates so that when a maximum torque is reached the driven member will rotate relative to the sprocket members and driving member.

RALPH E. CHERRY.

References Cited in the file of this patent

UNITED STATES PATENTS

| Number | Name | Date |
|---|---|---|
| 1,427,025 | Schlafly | Aug. 22, 1922 |
| 1,575,637 | Neth | Mar. 9, 1926 |
| 2,050,542 | Pace | Aug. 11, 1936 |
| 2,360,488 | Garman | Oct. 17, 1944 |

FOREIGN PATENTS

| Number | Country | Date |
|---|---|---|
| 302,074 | Great Britain | 1928 |
| 313,880 | Great Britain | 1930 |